United States Patent [19]

Barnsdale

[11] 4,171,177
[45] Oct. 16, 1979

[54] SCREW THREAD CUTTING MEMBER

[76] Inventor: Timothy J. R. Barnsdale, The Croft House, Haselor, Nr. Alcester, Warwickshire, England

[21] Appl. No.: 858,029

[22] Filed: Dec. 6, 1977

[30] Foreign Application Priority Data

Dec. 13, 1976 [GB] United Kingdom ............... 51871/76

[51] Int. Cl.² ............................................. B23G 5/06
[52] U.S. Cl. .................................. 408/218; 10/141 R; 408/219; 408/220; 408/222
[58] Field of Search .................. 10/140, 141 R, 152 T; 85/1 L, 46, 47; 408/217, 218, 219, 220, 222

[56] References Cited

U.S. PATENT DOCUMENTS

| 224,921 | 2/1880 | Kenworthy | 10/141 R |
| 252,868 | 1/1882 | Denison | 85/1 L |
| 2,093,172 | 9/1937 | Olson | 85/47 |
| 2,156,350 | 5/1939 | Olson | 85/47 |
| 2,204,866 | 6/1940 | Parish | 408/217 |
| 2,816,302 | 12/1957 | Bauer | 10/152 T |
| 2,828,493 | 4/1958 | Koehler | 408/222 |

FOREIGN PATENT DOCUMENTS 2300625  7/1973  Fed. Rep. of Germany ........ 10/141 R Primary Examiner—E. M. Combs
Attorney, Agent, or Firm—Watson, Cole, Grindle & Watson

[57] ABSTRACT

A male screw thread-formed member such as an insert having a thread cutting action has an exterior peripheral portion of substantially full V-thread form along which two or more angularly spaced apart flutes extend from one or both ends of the member, the member being provided with at least one non-helical rib initially of generally annular peripheral V-form at one or both ends thereof and on which is formed a varying reduced V-thread form which follows a helix corresponding to that of the full thread form whereby pointed cutting formations providing peaks of different radial heights and with some of them of offset disposition relative to the helix are formed on the or each rib at the flutes for effecting a distributed thread cutting action thereat, e.g., for use in thermo-setting plastic material.

6 Claims, 10 Drawing Figures

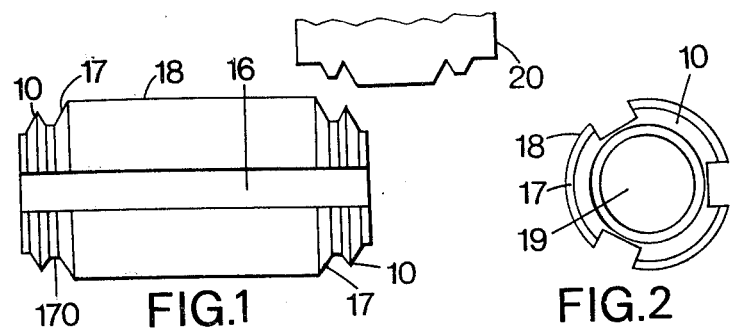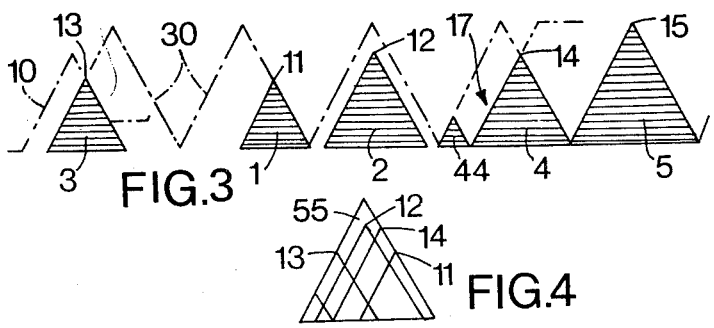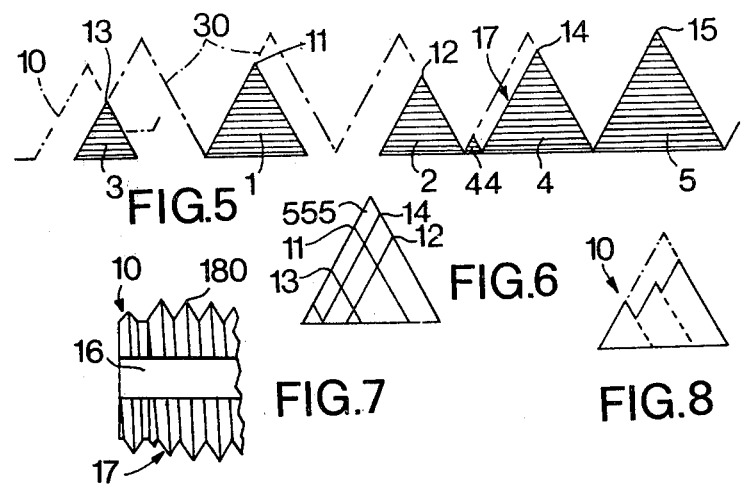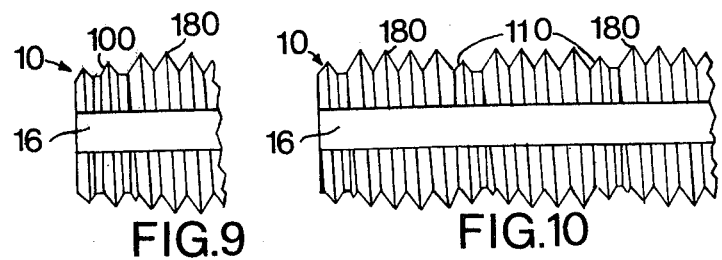

SCREW THREAD CUTTING MEMBER

This invention refers to male screw thread-formed members which are at least fluted so as to have a thread cutting or self-tapping action in a hole therefor in parent material and has particular practical application to inserts and self-tapping screws as well as to thread cutting taps.

The object of the invention is to provide such a member whereby an improved cutting action is obtained in hard or tough material such as thermo-setting plastics materials. Practical advantages in this respect will be apparent from the following disclosure, the invention also including the method of manufacture of the screw thread cutting members.

In the practical application of the invention to a self-tapping screw thread insert, the procedure is as follows, reference being had to the accompanying drawings in which:

FIG. 1—is a side elevation of a fluted insert blank shown in relation to a form tool, FIG. 2—is an end view of the FIG. 1 insert blank, FIGS. 3 and 4—are diagrams on an enlarged scale of a typical instance of formation of an end portion of the insert by a thread forming tool.

FIGS. 5 and 6—are diagrams similar to FIGS. 3 and 4 showing another typical instance of the formation, FIG. 7—is a detail end view of the finished insert, FIG. 8—is a further detail diagram, and FIGS. 9 and 10—show developed arrangements of the invention.

The fluted blank of the insert (FIGS. 1 and 2) is formed at both ends with a reduced non-helical rib 10 of screw thread V-form in cross-section, i.e. it is annular apart from the interruption by the flutes 16. In the example shown the insert is provided with three equi-spaced flutes 16 at 120° to one another but the number of flutes may be varied and is preferably not less than two.

In the usual way the insert is shown having a threaded bore 19 but the bore may be of plain or other form or the insert may be of male form, i.e. having a threaded shank or stud at one end which is threaded or otherwise formed.

A form tool 20 is indicated in FIG. 1 for producing the required form of the rib 10 and which also forms an adjacent non-helical flank 17 on the main body 18 of the insert which flank 17 is inclined to correspond to the V-form of the external thread form subsequently cut or otherwise machined about the exterior of the main body 18 of the insert. The groove 170 between the rib 10 and flank 17 is shown of truncated V-form to minimise reduction of wall thickness of the insert and thus avoid weakness in this respect. In the case of a screw threaded member of solid form the truncation may not be necessary especially in the case of screw thread taps where a full depth thread form may be required.

When the insert blank is subject to the action of a thread cutting or forming tool for the purpose of forming or cutting a full thread form 180 (FIG. 7) on the main body 18, and as the tool engages a leading rib 10 on appropriate relative axially parallel traverse of the tool and insert, the rib 10 is machined to a varying extent and also the flank 17 of the main body. The rib 10 and flank 17 at the other end are machined in a similar way, both ends of the insert being formed in this manner for use in either direction. The particular manner in which the rib 10 is machined depends on the instant of engagement of the thread cutting or forming tool therewith and a typical result obtained is indicated in FIGS. 3 and 4 where the full V or peak form of the leading rib 10 is shown in dotted lines while the full thread form of the tool and that produced at 180 (FIG. 7) on the body 18 of the finished insert is indicated in phantom outline at 30.

Thus the engagement of the tool with the leading rib 10 may be such that at the first of the flutes 16 the portion 1 of the rib 10 which is left and is shown shaded is of V-form but is of reduced height and also offset relative to the helix of the thread form 30. At the second flute the portion 2 of the rib 10 left is also of V-form but of greater height and shown lying substantially on the helix of the threaded form 30 while at the third flute a reduced height V-form portion 3 is left similar to that shown at 1 but offset in the opposite direction from the helix of the thread form. At 4 the effect of the thread cutting or forming tool on the flank 17 of the main body portion is indicated and provides at one of the flutes 16 a major offset V-form portion 4 and also a minor offset V-form portion 44.

These remaining rib and flank portions 1, 2, 3, 4 provide at the flutes 16 formations of reduced V-thread form of varying height and in at least two cases are offset so as to provide differently positioned cutting tips or peaks of point form at 11, 12, 13, 14, at the flutes 16. Thus each point 11, 12, 13, 14, performs a cutting operation in material into which the insert is driven and so provides a distributed total cutting action at the flutes 16, the combined effect of which is indicated in FIG. 4 where only a small portion 55 of parent material is left for final removal by the point 15 of the full form thread portion at 5.

In a similar manner to FIGS. 3 and 4, another typical instance of the cutting point formation obtained at each flute 16 is shown in FIGS. 5 and 6 where similar reference numerals are employed and in which the final portion of parent material left for removal by the full form thread portion 5 is indicated at 555 in FIG. 6.

FIG. 7 shows a leading portion of the finished thread formed insert in which reduced formation of the rib 10 and flank 17 is indicated and which varies from flute to flute in the manner already described.

The advantages of the arrangement are that the thread cutting action in the receiving or parent material is not confined to one point at one flute which causes excessive wear of the point and the accumulation and compaction of cut away material mostly in one flute only, but instead the distributed cutting action spreads the cutting load over some five cutting points while the cut-away material is also distributed in each of the flutes 16 thus avoiding compaction and resulting jamming or like stresses. A further advantage resides in the fact that all the formations 1,2,3,4 and 5 at the flutes 16 provide cutting points or peaks 11,12,13,14 and 15, i.e. they are not truncated and which would otherwise provide an increased width of cutting edge with resulting generation of increased torque in cutting. This may cause a hollow insert to collapse or a solid screw threaded member to break off or at least cause a rubbing action in parent material especially in thermo-setting plastic material.

The general arrangement also provides a further advantage in that a taper lead is not required and instead the lead is very largely confined to that rib 10 which first enters a hole for the insert in parent material. Thus full thread engagement is provided almost to the end or bottom of the hole for obtaining maximum strength engagement of the insert with the hole wall.

The complete machining of the insert from bar stock including the formation of the rib 10 at each end by the form tool 20 can be readily carried out as a continuous and rapid process in a suitable automatic lathe.

Although having particular practical application to screw thread inserts, the invention is also applicable to self-tapping screws and similar male threaded members having a fluted external thread form including screw thread taps e.g. of the plug type for tapping blind or internally shouldered holes.

If desired the fluting 16 may extend from an end or from each end of the insert and into the full thread form 180 on the main body 18 for only part of the length of the latter. Furthermore, and in such a case, the fluting 16 may extend in depth into the insert e.g., to provide an insert which is slotted in a longitudinal direction from at least one end. The fluting or slotting so provided may be of straight or spiral form in relation to the longitudinal axis of the insert.

In a development, more than one non-helical rib 10, 100 (FIG. 9) can be provided at one or both ends of the insert or other screw threaded member, the adjacent ribs 10, 100 so provided being preferably of increasing diameter towards the full thread form 180 (but of less diameter than the latter) and they can also be of closer pitch than that of the full thread form 180.

Where continued thread cutting or tapping use of the screw threaded member is required such as in the case of a tap, the production of the reduced peaks 1,2,3,4 and cutting points or tips 11,12,13,14 thereat may be sychronised with the formation of the thread form on the member. Thus in order to avoid the occurrence of rubbing due to the increased diameter between the flutes 16 as indicated by peaks 1 and 2 in FIG. 3, a compound peak form arrangement can be provided on the non-helical rib 10 in the manner indicated in FIG. 8, i.e. by a suitable form tool. In this case the peaks are progressively increasing in height at the flutes 16 from one quarter to three quarters of the depth of the full thread form at intervals of one third of the pitch of the thread form in the case of three flutes 16.

Furthermore ribs 110 (FIG. 10) of this form can be produced at spaced apart locations along the thread form of a tap such that when the cutting points or tips 11,12,13,14 wear out, the leading end can be ground off back to the cutting edges of the next rib 110, i.e., without entailing tap sharpening or grinding and the skill involved.

I claim:

1. A male screw thread-formed member having a thread cutting action, comprising a generally cylindrical body having at least two angularly spaced apart longitudinal flutes each defined by a groove in the outer periphery of said body and extending along the body from at least one end thereof, said body also having a helically threaded portion of substantially full V-thread form about said outer periphery with said flutes extending into said thread form, said body further having at at least said one end thereof at least one rib of substantially helical form of generally peripheral V-form in cross section adjacent said threaded portion and of reduced diameter relative thereto and co-axial therewith, said rib having said flutes passing through the periphery thereof to thereby form between said flutes a plurality of reduced V-thread formations of varying cross section and relative radial heights; which follow a helix corresponding to that of the substantially full V-thread form whereby resulting pointed cutting formations provide peaks of different radial heights, and at least some of said rib formations are positioned, at the intersection of said formations and said flutes, in offset disposition relative to said helix of said threaded portion for effecting a distributed thread cutting action thereat.

2. A male screw thread-formed member according to claim 1, wherein the peaks of the pointed thread cutting formations progressively increase in radial height on the rib.

3. A male screw thread-formed member according to claim 1, wherein said cylindrical body has at least two adjacent ribs provided at at least said one end of the body adjacent said threaded portion and both of reduced diameter relative to the full V-thread form of said threaded portion and co-axial therewith, each of said ribs being formed with said varying V-thread formations whereby said pointed cutting formations providing peaks of different radial heights with at least some of them of said offset disposition are formed on the ribs at the flutes.

4. A male screw thread-formed member according to claim 3, wherein said adjacent ribs are of increasing diameter from said one end.

5. A male screw thread-formed member according to claim 3, wherein said adjacent ribs are of closer pitch than the pitch of the said substantially full V-thread form.

6. A male screw thread-formed member according to claim 1, wherein further ribs having said varying V-thread formations so as to present pointed thread cutting formations having peaks of different radial heights with at least some of them of said offset disposition, are also provided at locations situated along the length of the cylindrical body and adjacent corresponding threaded portions of substantially full V-thread form, to which further ribs the cylindrical body can be shortened such as by grinding in order to obtain fresh pointed cutting formations at an end of the body after those previously at the end of the body have become worn.

* * * * *